(12) United States Patent
Bair et al.

(10) Patent No.: US 10,688,417 B2
(45) Date of Patent: Jun. 23, 2020

(54) SUPPORT AND DRAINAGE MATERIAL, FILTER, AND METHOD OF USE

(71) Applicant: Pall Corporation, Port Washington, NY (US)

(72) Inventors: James A. Bair, Cortland, NY (US); Thomas M. Sorensen, Freeville, NY (US)

(73) Assignee: PALL CORPORATION, Port Washington, NY (US)

( * ) Notice: Subject to any disclaimer, the term of this patent is extended or adjusted under 35 U.S.C. 154(b) by 40 days.

(21) Appl. No.: 16/169,564

(22) Filed: Oct. 24, 2018

(65) Prior Publication Data

US 2020/0129892 A1    Apr. 30, 2020

(51) Int. Cl.
*B01D 29/56* (2006.01)
*B01D 29/05* (2006.01)

(52) U.S. Cl.
CPC .......... *B01D 29/56* (2013.01); *B01D 29/05* (2013.01); *B01D 2201/0407* (2013.01); *B01D 2201/0415* (2013.01); *B01D 2201/127* (2013.01); *B01D 2201/32* (2013.01); *B01D 2201/60* (2013.01); *B01D 2239/0618* (2013.01); *B01D 2239/0654* (2013.01)

(58) Field of Classification Search
CPC ...... B01D 27/06; B01D 29/07; B01D 29/016; B01D 29/031; B01D 29/21; B01D 29/232; B01D 29/333; B01D 29/353; B01D 46/51; B01D 46/523; B01D 2313/14; B01D 2313/143; B01D 2313/146; B01D 2201/0407; B01D 2201/0415; B01D 2201/127
See application file for complete search history.

(56) References Cited

U.S. PATENT DOCUMENTS

| | | | | |
|---|---|---|---|---|
| 2,952,333 A * | 9/1960 | Bush | ....................... | F24F 13/28 55/500 |
| 3,280,985 A * | 10/1966 | Czerwonka | ............ | B01D 29/07 210/489 |
| 3,780,870 A * | 12/1973 | Esmond | ................. | B01D 61/28 210/321.77 |
| 5,263,792 A | 11/1993 | Davis et al. | | |
| 5,543,047 A | 8/1996 | Stoyell et al. | | |
| 5,552,048 A | 9/1996 | Miller et al. | | |
| 5,702,801 A * | 12/1997 | Chien | ...................... | D04H 1/74 156/181 |
| 6,045,597 A * | 4/2000 | Choi | .................... | B01D 29/012 55/483 |
| 6,786,013 B2 | 9/2004 | Coulton | | |
| 2004/0060858 A1 | 4/2004 | Lucas et al. | | |
| 2004/0131423 A1 | 7/2004 | Ianniello et al. | | |
| 2011/0226691 A1* | 9/2011 | Lucas | ................... | B01D 25/26 210/493.5 |

FOREIGN PATENT DOCUMENTS

WO    WO 2006/074383 A2    7/2006

OTHER PUBLICATIONS

European Patent Office, Extended European Search Report in counterpart European Application No. 19201954.5, dated Mar. 6, 2020.

* cited by examiner

*Primary Examiner* — Benjamin M Kurtz
(74) *Attorney, Agent, or Firm* — Leydig Voit & Mayer, Ltd.

(57) ABSTRACT

Support and drainage materials, filter including the materials, and methods of use are disclosed.

8 Claims, 5 Drawing Sheets

Constant Thickness    Tapered    FIG. 6A

FIG. 6B

SUPPORT AND DRAINAGE MATERIAL, FILTER, AND METHOD OF USE

BACKGROUND OF THE INVENTION

Support and drainage elements such as meshes (also called screens or netting) are utilized in a number of filtration applications, wherein the support and drainage ("S&D") elements are arranged upstream and/or downstream of porous filter media. The support and drainage elements have much larger openings than the pores of the filter media, and provide support to the filter media and/or provide good drainage for the filter media.

However, there is a need for improved support and drainage elements.

The present invention provides for ameliorating at least some of the disadvantages of the prior art. These and other advantages of the present invention will be apparent from the description as set forth below.

BRIEF SUMMARY OF THE INVENTION

An embodiment of the invention provides a support and drainage material comprising a first element comprising a mesh or a non-woven fabric having a first end and a second end, and at least a first section and a second section, the first section having a first major surface extending from the first end to the second end, and a second major surface extending from the first end to the second end; the second section having a first major surface extending a distance from the first end toward the second end, wherein the distance is less than a distance from the first end to the second end, and a second major surface extending a distance from the first end toward the second end, wherein the distance is less than the distance from the first end to the second end; and, a bulk through the element, extending between the first major surface of the second section and the second major surface of the first section, the bulk having a thickness extending from the first end to the second end; the bulk having a greater thickness at the first end and a lesser thickness at the second end.

In an embodiment, the support and drainage material further comprises a second element comprising a mesh or a non-woven fabric having a first end and a second end, and at least a second element first section and a second element second section, the second element first section having a first major surface extending from the first end to the second end, and a second major surface extending from the first end to the second end; the second element second section having a first major surface extending a distance from the first end toward the second end, wherein the distance is less than a distance from the first end to the second end, and a second major surface extending a distance from the first end toward the second end, wherein the distance is less than the distance from the first end to the second end; and, a bulk through the second element, extending between the first major surface of the second section and the second major surface of the first section, the bulk having a thickness extending from the first end to the second end; the bulk having a greater thickness at the first end and a lesser thickness at the second end; wherein the second element is interposed between the first section and the second section of the first element, such that the second element second section is interposed between the first element second section and the second element first section, and the second element first section is interposed between the second element second section and the first element first section.

In some embodiments, the thickness of the bulk at the first end of the first element is at least twice the thickness of the bulk at the second end of the first element.

In another embodiment, the thickness of the bulk at the first end of the first element is at least twice the thickness of the bulk at the second end of the first element, and the thickness of the bulk at the first end of the second element is at least twice the thickness of the bulk at the second end of the second element.

In another embodiment, when the second element is interposed between the first section and the second section of the first element, the support and drainage material has a combined bulk of the first element and the second element, and the combined bulk has a thickness at the first end of the material that is at least twice the thickness of the bulk at the second end of the material.

In another embodiment, a support and drainage material system is provided, comprising a first support and drainage material and a second separate support and drainage material; (a) the first support and drainage material comprising a first element comprising a mesh or a non-woven fabric having a first end and a second end, and at least a first section and a second section; the first section having a first major surface extending from the first end to the second end, and a second major surface extending from the first end to the second end; the second section having a first major surface extending a distance from the first end toward the second end, wherein the distance is less than a distance from the first end to the second end, and a second major surface extending a distance from the first end toward the second end, wherein the distance is less than the distance from the first end to the second end; and, a bulk through the element, extending between the first major surface of the second section and the second major surface of the first section, the bulk having a thickness extending from the first end to the second end; the bulk having a greater thickness at the first end and a lesser thickness at the second end; and (b) the second support and drainage material comprising a second element comprising a mesh or a non-woven fabric having a first end and a second end, and at least a first section and a second section; the first section having a first major surface extending from the first end to the second end, and a second major surface extending from the first end to the second end; the second section having a first major surface extending a distance from the first end toward the second end, wherein the distance is less than a distance from the first end to the second end, and a second major surface extending a distance from the first end toward the second end, wherein the distance is less than the distance from the first end to the second end; and, a bulk through the element, extending between the first major surface of the second section and the second major surface of the first section, the bulk having a thickness extending from the first end to the second end; the bulk having a greater thickness at the first end and a lesser thickness at the second end; wherein the first support and drainage material and the second support and drainage material are suitable for arrangement on opposing sides of a pleated filter.

In some embodiments, the support and drainage material system further comprises a third support and drainage material comprising a third element comprising a mesh or a non-woven fabric having a first end and a second end, and at least a first section and a second section, and a fourth separate support and drainage material comprising a fourth element comprising a mesh or a non-woven fabric having a first end and a second end, and at least a first section and a second section; wherein the third support and drainage material is interposed between the first section and the second section of the first element; and, the fourth support and drainage material is interposed between the first section and the second section of the second element; wherein the first support and drainage material with the interposed third support and drainage material and the second support and drainage material with the interposed fourth support and drainage material are suitable for arrangement on opposing sides of a pleated filter.

A filter arrangement according to an embodiment of the invention comprises a pleated porous filter having an upstream surface and a downstream surface, the upstream surface having a first upstream end and a second upstream end, and the downstream surface having a first downstream end and a second downstream end; and, an embodiment of the support and drainage material, arranged to contact the upstream surface of the pleated porous filter, or to contact the downstream surface of the pleated porous filter.

In another embodiment, a filter system is provided, comprising a pleated porous filter having an upstream surface and a downstream surface; and an embodiment of the support and drainage material system, wherein the pleated porous filter is arranged between the first support and drainage material and the second support and drainage material, and the first support and drainage material and the second support and drainage material are rotated 180 degrees with respect to each other, with the filter medium in between.

A filter system according to another embodiment of the invention comprises a pleated porous filter having an upstream surface and a downstream surface, the upstream surface having a first upstream end and a second upstream end, and the downstream surface having a first downstream end and a second downstream end; and an embodiment of the support and drainage material system, wherein the pleated porous filter is arranged between (a) the first support and drainage material having the third support and drainage material interposed between the first section and the second section of the first element, providing a combined bulk of the first support and drainage material and the third support and drainage material, and the combined bulk has a thickness at the first end of the material that is at least twice the thickness of the bulk at the second end of the material; and, (b) the second support and drainage material having the fourth support and drainage material interposed between the first section and the second section of the second element, providing a combined bulk of the second support and drainage material and the fourth support and drainage material, and the combined bulk has a thickness at the first end of the material that is at least twice the thickness of the bulk at the second end of the material; and the first support and drainage material and the second support and drainage material are rotated 180 degrees with respect to each other.

Embodiments of methods of filtering fluid are also provided, the method comprising passing a fluid through an embodiment of the filter system, including passing fluid through the first support and drainage material, the upstream surface of the pleated porous filter, the downstream surface of the pleated porous filter, and the second support and drainage material, or including passing fluid through the first support and drainage material with the interposed third support and drainage material, the upstream surface of the pleated porous filter, the downstream surface of the pleated porous filter, and the second support and drainage material with the interposed fourth support and drainage material.

BRIEF DESCRIPTION OF THE SEVERAL VIEWS OF THE DRAWING(S)

FIG. 1 shows, in an isometric diagrammatic view, a support and drainage material according to an embodiment of the invention, wherein the material (a single insert) comprises 2 sections of mesh(es) or non-woven fabric(s) providing a tapered bulk thickness.

FIGS. 2A-2D show an embodiment of a filter system and an embodiment of a support and drainage material system (wherein the support and drainage material system comprises a plurality of separate inserts), the filter system comprising a pleated porous filter having an upstream surface and a downstream surface, the upstream surface having a first upstream end and a second upstream end, and the downstream surface having a first downstream end and a second downstream end; and an embodiment of the support and drainage material system, wherein the pleated porous filter is arranged between the first support and drainage material and the second support and drainage material, and the first support and drainage material and the second support and drainage material are rotated 180 degrees with respect to each other, such that the first upstream end of the upstream surface of the pleated porous filter faces the greater thickness of the bulk of the first support and drainage material, the second upstream end of the upstream surface of the pleated porous filter faces the lesser thickness of the bulk of the first support and drainage material; and the first downstream end of the downstream surface of the pleated porous filter faces the lesser thickness of the bulk of the second support and drainage material, and the second downstream end of the downstream surface of the pleated porous filter faces the greater thickness of the bulk of the second support and drainage material. FIG. 2A shows an isometric view, FIG. 2B shows a front view, and FIG. 2C shows a cross-section view of the filter system along sectional view J-J as shown in FIG. 2B, also showing a plurality of separate first support and drainage material and second support and drainage material inserts.

FIG. 2D shows a top view. In this illustrated embodiment, particularly as shown in FIG. 2C, the separate support and drainage materials (inserts) comprise 2 steps, each step having a different bulk thickness. Moreover, in this illustrated embodiment, the thickness of the bulk at the first end is twice the thickness of the bulk at the second end.

FIGS. 3A-3D show another embodiment of a filter system and another embodiment of a support and drainage material system (wherein the support and drainage material system comprises a plurality of separate inserts), the filter system comprising a laid-over-pleat (LOP) pleated porous filter having an upstream surface and a downstream surface; and an embodiment of the support and drainage material system, wherein the first support and drainage material and the second support and drainage material are each curved, and the pleated porous filter is arranged between the first support and drainage material and the second support and drainage material, and the first support and drainage material and the second support and drainage material are rotated 180 degrees with respect to each other, with the filter medium in between.

FIGS. 4A-4D show yet another embodiment of a filter system and an embodiment of a support and drainage material system (wherein the support and drainage material system comprises a plurality of separate inserts).

FIGS. 5A-5D show an embodiment of an individual support and drainage material comprising an insert as shown in FIGS. 4A-4D, separated from the pleated porous filter.

DETAILED DESCRIPTION OF THE INVENTION

In accordance with an embodiment of the present invention, a support and drainage material is provided, comprising a first element comprising a mesh or a non-woven fabric having a first end and a second end, and at least a first section and a second section, the first section having a first major surface extending from the first end to the second end, and a second major surface extending from the first end to the second end; the second section having a first major surface extending a distance from the first end toward the second end, wherein the distance is less than a distance from the first end to the second end, and a second major surface extending a distance from the first end toward the second end, wherein the distance is less than the distance from the first end to the second end; and, a bulk through the element, extending between the first major surface of the second section and the second major surface of the first section, the bulk having a thickness extending from the first end to the second end; the bulk having a greater thickness at the first end and a lesser thickness at the second end.

In some embodiments, the thickness of the bulk at the first end of the first element is at least twice the thickness of the bulk at the second end of the first element.

In an embodiment, the support and drainage material further comprises a second element comprising a mesh or a non-woven fabric having a first end and a second end, and at least a second element first section and a second element second section, the second element first section having a first major surface extending from the first end to the second end, and a second major surface extending from the first end to the second end; the second element second section having a first major surface extending a distance from the first end toward the second end, wherein the distance is less than a distance from the first end to the second end, and a second major surface extending a distance from the first end toward the second end, wherein the distance is less than the distance from the first end to the second end; and, a bulk through the second element, extending between the first major surface of the second section and the second major surface of the first section, the bulk having a thickness extending from the first end to the second end; the bulk having a greater thickness at the first end and a lesser thickness at the second end; wherein the second element is interposed between the first section and the second section of the first element, such that the second element second section is interposed between the first element second section and the second element first section, and the second element first section is interposed between the second element second section and the first element first section.

In some embodiments, the greater thickness is at least about 10% more than the lesser thickness. In some embodiments comprising a extruded mesh, the greater thickness is typically at least about 50% greater than the lesser thickness (e.g., about 80% to about 90% for an extruded mesh, about 60% to about 70% for a woven mesh).

In one embodiment of the support and drainage material, the thickness of the bulk at the first end of the first element is at least twice the thickness of the bulk at the second end of the first element, and the thickness of the bulk at the first end of the second element is at least twice the thickness of the bulk at the second end of the second element.

In an embodiment of the support and drainage material, the material comprises a folded mesh or non-woven fabric, wherein folding the mesh or non-woven fabric provides the first and second sections, or wherein folding the mesh or non-woven fabric provides the first and second sections of both the first element and the second element.

In some embodiments, the support and drainage material includes at least one flexible hinge.

In some embodiments, the support and drainage material comprises at least 2 steps having a different bulk thickness. For example, in an embodiment, the material comprises at least 4 steps having a different bulk thickness.

In another embodiment, the thickness of the bulk at the first end of the first element is at least twice the thickness of the bulk at the second end of the first element, and the thickness of the bulk at the first end of the second element is at least twice the thickness of the bulk at the second end of the second element.

In yet another embodiment, when the second element is interposed between the first section and the second section of the first element, the support and drainage material has a combined bulk of the first element and the second element, and the combined bulk has a thickness at the first end of the material that is at least twice the thickness of the bulk at the second end of the material.

In another embodiment, a support and drainage material system is provided, comprising a first support and drainage material and a second separate support and drainage material; (a) the first support and drainage material comprising a first element comprising a mesh or a non-woven fabric having a first end and a second end, and at least a first section and a second section; the first section having a first major surface extending from the first end to the second end, and a second major surface extending from the first end to the second end; the second section having a first major surface extending a distance from the first end toward the second end, wherein the distance is less than a distance from the first end to the second end, and a second major surface extending a distance from the first end toward the second end, wherein the distance is less than the distance from the first end to the second end; and, a bulk through the element, extending between the first major surface of the second section and the second major surface of the first section, the bulk having a thickness extending from the first end to the second end; the bulk having a greater thickness at the first end and a lesser thickness at the second end; and (b) the second support and drainage material comprising a second element comprising a mesh or a non-woven fabric having a first end and a second end, and at least a first section and a second section; the first section having a first major surface extending from the first end to the second end, and a second major surface extending from the first end to the second end; the second section having a first major surface extending a distance from the first end toward the second end, wherein the distance is less than a distance from the first end to the second end, and a second major surface extending a distance from the first end toward the second end, wherein the distance is less than the distance from the first end to the second end; and, a bulk through the element, extending between the first major surface of the second section and the second major surface of the first section, the bulk having a thickness extending from the first end to the second end; the bulk having a greater thickness at the first end and a lesser thickness at the second end; wherein the first support and drainage material and the second support and drainage material are suitable for arrangement on opposing sides of a pleated filter.

In some embodiments, the support and drainage material system further comprises a third support and drainage material comprising a third element comprising a mesh or a non-woven fabric having a first end and a second end, and at least a first section and a second section, and a fourth separate support and drainage material comprising a fourth element comprising a mesh or a non-woven fabric having a first end and a second end, and at least a first section and a second section; wherein the third support and drainage material is interposed between the first section and the second section of the first element; and, the fourth support and drainage material is interposed between the first section and the second section of the second element; wherein the first support and drainage material with the interposed third support and drainage material and the second support and drainage material with the interposed fourth support and drainage material are suitable for arrangement on opposing sides of a pleated filter.

A filter arrangement according to an embodiment of the invention comprises a pleated porous filter having an upstream surface and a downstream surface; and, an embodiment of the support and drainage material, arranged to contact the upstream surface of the pleated porous filter, or to contact the downstream surface of the pleated porous filter.

In another embodiment, a filter system is provided, comprising a pleated porous filter having an upstream surface and a downstream surface; and an embodiment of the support and drainage material system, wherein the pleated porous filter is arranged between the first support and drainage material and the second support and drainage material, and the first support and drainage material and the second support and drainage material are rotated 180 degrees with respect to each other, with the filter medium in between.

A filter system according to another embodiment of the invention comprises a pleated porous filter having an upstream surface and a downstream surface, the upstream surface having a first upstream end and a second upstream end, and the downstream surface having a first downstream end and a second downstream end; and an embodiment of the support and drainage material system, wherein the pleated porous filter is arranged between (a) the first support and drainage material having the third support and drainage material interposed between the first section and the second section of the first element, providing a combined bulk of the first support and drainage material and the third support and drainage material, and the combined bulk has a thickness at the first end of the material that is at least twice the thickness of the bulk at the second end of the material; and, (b) the second support and drainage material having the fourth support and drainage material interposed between the first section and the second section of the second element, providing a combined bulk of the second support and drainage material and the fourth support and drainage material, and the combined bulk has a thickness at the first end of the material that is at least twice the thickness of the bulk at the second end of the material; and the first support and drainage material and the second support and drainage material are rotated 180 degrees with respect to each other, with the filter medium in between.

In one embodiment of the filter system, the pleated porous filter comprises a laid-over-pleat filter.

Additionally, or alternatively, in some embodiments of the filter system, the filter further comprises an inner core and an outer cage.

Embodiments of methods of filtering fluid are also provided, the method comprising passing a fluid through an embodiment of the filter system, including passing fluid through the first support and drainage material, the upstream surface of the pleated porous filter, the downstream surface of the pleated porous filter, and the second support and drainage material, or including passing fluid through the first support and drainage material with the interposed third support and drainage material, the upstream surface of the pleated porous filter, the downstream surface of the pleated porous filter, and the second support and drainage material with the interposed fourth support and drainage material.

Advantageously, in comparison to conventional S&D materials, the inventive S&D materials, when placed between sections of filter media (pleated or non-pleated), provide support and uniform spacing (including reducing or preventing nesting wherein strands of mesh on opposing surfaces fit between one another rather than to lie atop one another), while exhibiting reduced edgewise flow resistance (such that the pressure drop in the support and drainage material is less than the pressure drop across the filter element), thereby providing an even distribution of fluid across the surface of the filter element and reduced face loss.

When used with a pleated filter, they can reduce filter media damage (especially membrane damage) and allow more uniform flow distribution (including flow through the pleated tip of the filter), and provide a stable pleat-pack. Additionally, support and drainage materials including hinges are compatible with conventional pleating devices.

Furthermore, when used with a pleated filter, the use of tapered materials can lead to an overall thinner pleat pitch, allowing more filter material in a given volume, while maintaining a desirable pressure differential, and improving filtration efficiency.

Moreover, in contrast with conventional constant thickness support and drainage elements, wherein the inventors have found wasted area as the local flow rate is not correlated with the needed flow area, the inventive support and drainage materials can advantageously better match the local flow rate to the needed flow area.

Figure 6A:
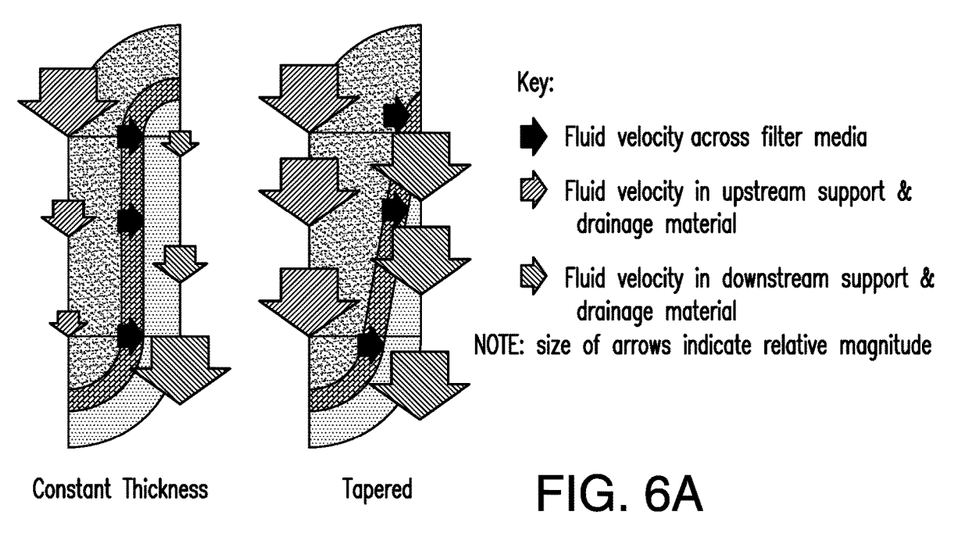
FIG. 6A shows, diagrammatically, the difference in fluid velocity across the filter media and in upstream and downstream support and drainage (S&D) material through the half pleat of a pleated filter medium with conventional constant thickness S&D materials (on the left) compared to S&D materials according to an embodiment of the invention (on the right).
Figure 6B:
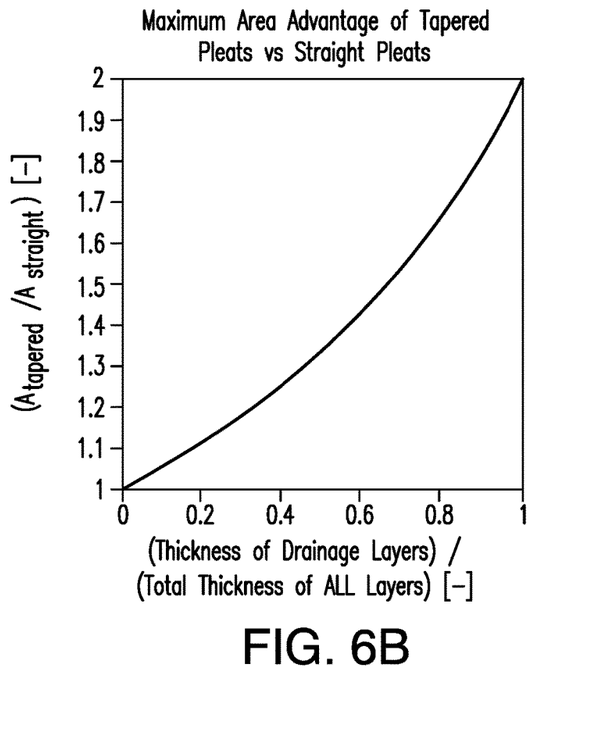
FIG. 6B shows the illustrative advantage in maximum filter area in a pleated filter with tapered S&D material compared to conventional constant thickness S&D material.

Illustratively, FIG. 6A shows, diagrammatically, the difference in fluid velocity across the filter media and in upstream and downstream support and drainage (S&D) material through the half pleat of a pleated filter medium with conventional constant thickness S&D materials (on the left) compared to S&D materials according to an embodiment of the invention (on the right). In contrast with conventional constant thickness S&D elements, wherein area is wasted as the local flow rate is not correlated with the needed flow area allowing velocity to vary, the inventive S&D materials can advantageously better match the local flow rate to the needed flow area keeping the velocity constant. FIG. 6B shows the illustrative advantage in maximum filter area in a pleated filter with tapered S&D material compared to conventional constant thickness S&D material, wherein "0" on the horizontal axis indicates that the S&D material is infinitesimally thin and there is no possibility of increasing the filter area by tapering the S&D material, and "1" on the horizontal axis indicates that the filter material is infinitesimally thin in which case the filter area can be increased by a factor of two. FIG. 6B suggests a maximum that can be achieved in the limit of one end of the S&D material tapering to zero thickness, real situations will fall below this curve.

The support and drainage material can be flat or planar, or substantially flat or planar, and in some embodiments, the support and drainage material is or can be curved.

Embodiments of the invention are suitable for use with a variety of filter configurations, including flat pleat filter packs, direct flow spiral filters, stacked disk filters, cross-flow cassettes, and are particularly suitable for "laid-over-pleat" (LOP) filter configurations (as described in, for example, U.S. Pat. No. 5,543,047).

Each of the components of the invention will now be described in more detail below, wherein like components have like reference numbers. Where upstream and downstream S&D materials are each illustrated with the same components, the corresponding components are identified with similar reference numbers, followed by "'", e.g., 401' corresponds to 401, 402' corresponds to 402, etc.).

Figures 1, 2A, 2B, 2C, 2D:
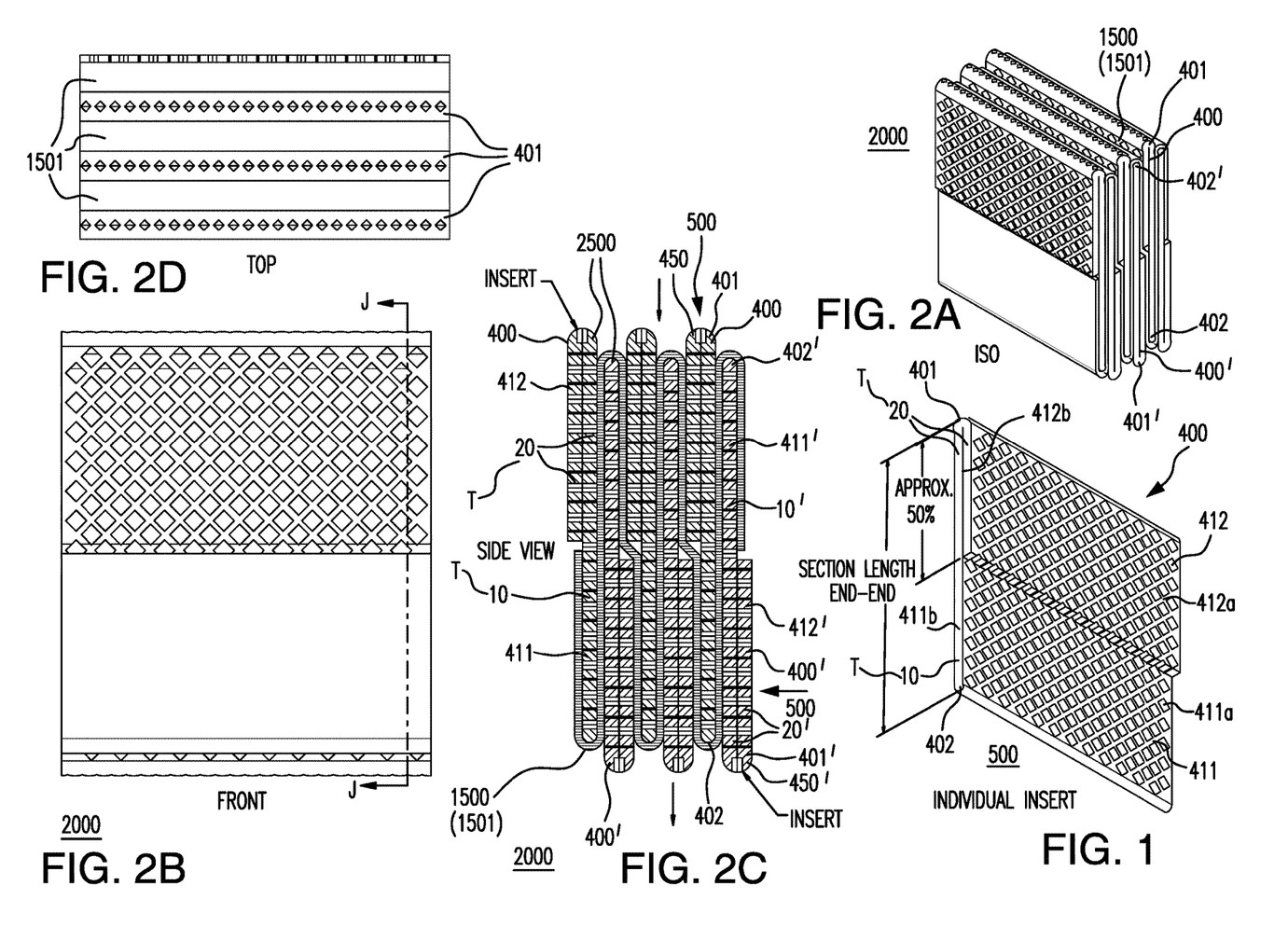

In accordance with the embodiment illustrated in FIG. 1 (and in more detail in FIG. 2C, which also shows an embodiment of the S&D material system 2500 and an embodiment of a filter system 2000), a S&D material 500 comprises an element 400 comprising a mesh or a non-woven fabric having a first end 401 and a second end 402, and at least a first section 411 and a second section 412, the first section 411 having a first major surface 411a extending from the first end to the second end, and a second major surface 411b extending from the first end to the second end; the second section 412 having a first major surface 412a extending a distance from the first end toward the second end, wherein the distance is less than a distance from the first end to the second end, and a second major surface 412b extending a distance from the first end toward the second end, wherein the distance is less than the distance from the first end to the second end; and, a bulk through the element, extending between the first major surface of the second section and the second major surface of the first section, the bulk having a thickness T extending from the first end to the second end; the bulk having a greater thickness at the first end and a lesser thickness at the second end. As a result, the bulk has a tapered thickness from the first end to the second end.

FIGS. 2A and 2B illustrate support and drainage materials arranged upstream and downstream of a pleated porous filter comprising a pleated porous filter element 1501, wherein the upstream and downstream materials are illustrated as having the same components, wherein the corresponding components are identified with similar reference numbers, wherein materials 500 and 500' (comprising elements 400 and 400' respectively) comprise a support and drainage element system 2500.

Additionally, in the embodiment illustrated in FIG. 2C, the first ends 401, 401' each include a folded hinge 450, 450' as a single continuous material is folded to provide the 2 sections.

Figure 4A:
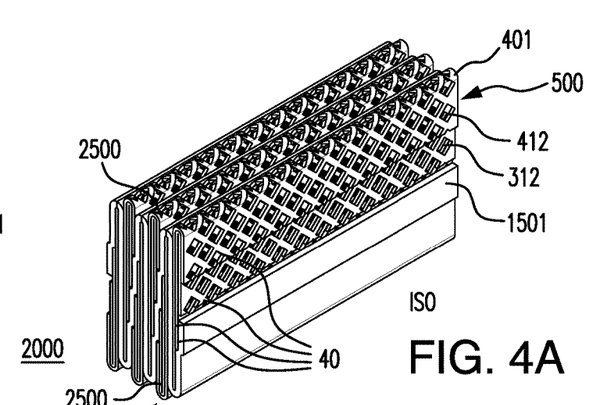
FIG. 4A shows an isometric view.
Figure 4B:
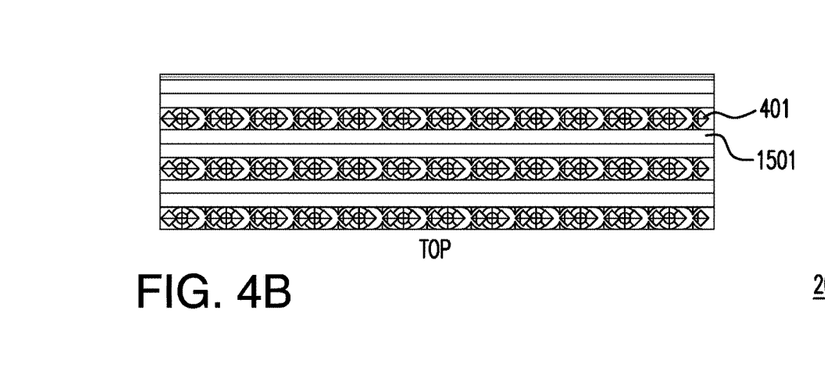
FIG. 4B shows a top view.
Figure 4C:
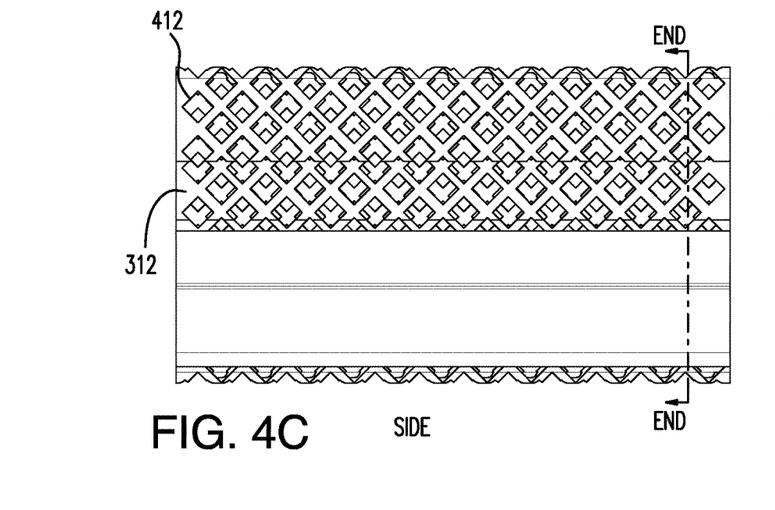
FIG. 4C shows a side view.
Figure 4D:
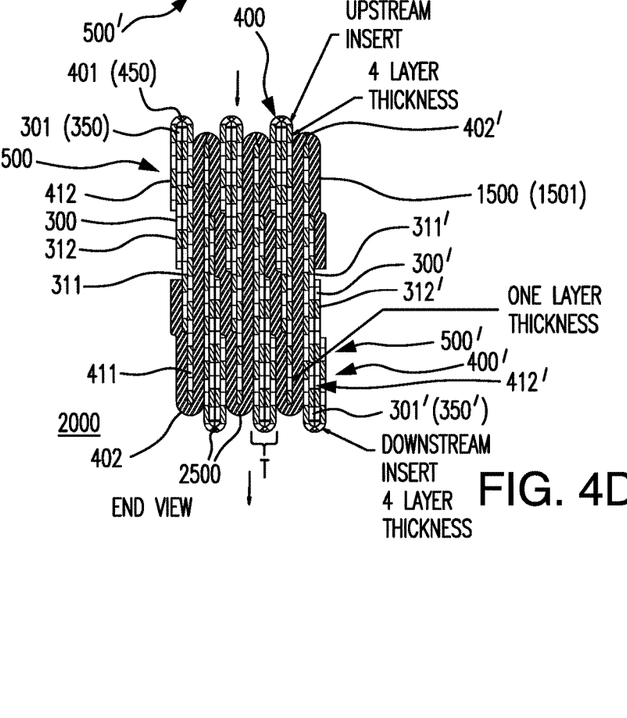
FIG. 4D shows a cross-sectional view (with arrows showing fluid flow) along the sectional End-End view as shown in FIG. 4C.
Figure 5A:
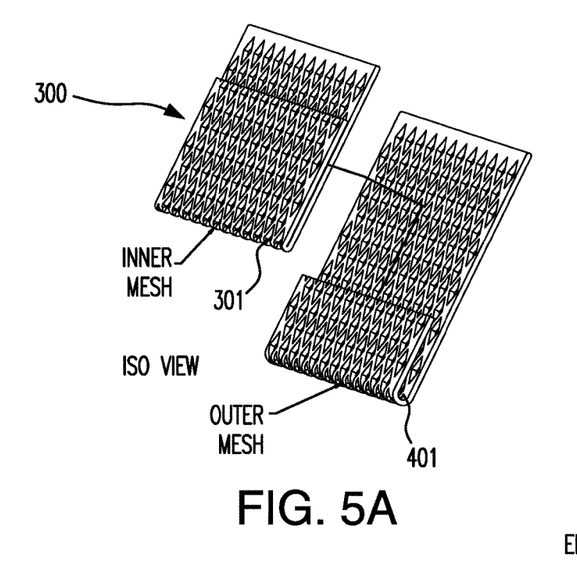
FIG. 5A shows an isometric view of separate first and third elements.
Figure 5B:
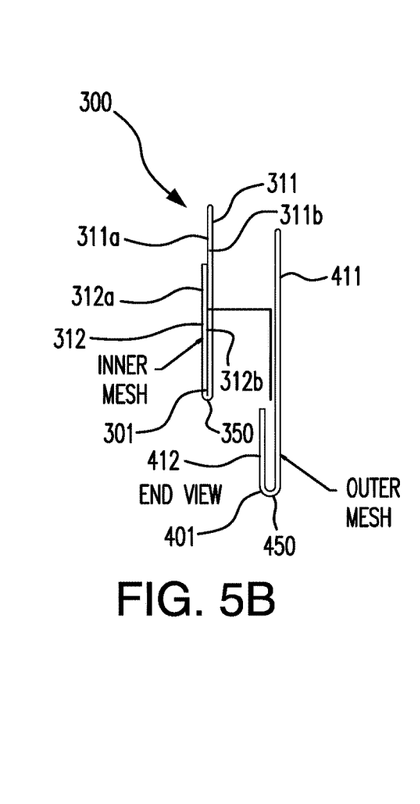
FIG. 5B shows a side view of the separate first and third elements based on the sectional End-End view as shown in FIG. 5C.
Figure 5C:
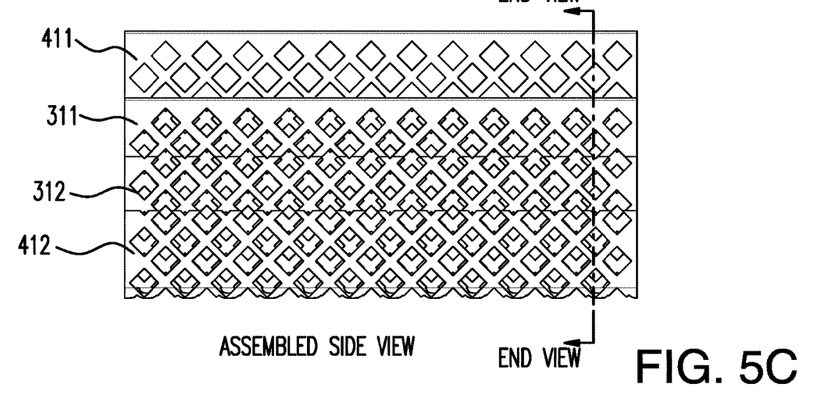
FIG. 5C shows an assembled side view.
Figure 5D:
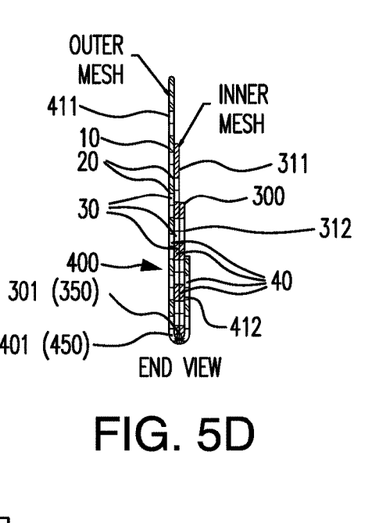
FIG. 5D shows an assembled end view along the sectional End-End view as shown in FIG. 5C.

In the embodiment illustrated in FIGS. 1, 2C, 4D, and 5D, the element 400 comprises steps of different thicknesses. A support and drainage material can have any number of steps. FIG. 2C shows S&D inserts arranged upstream and downstream of the filter, each insert comprising 2 steps, 10, 20 (10', 20'), with 20 (20') having the greatest thickness, wherein FIG. 5D shows an S&D insert comprising 4 steps 10, 20, 30, 40, with 40 having the greatest thickness.

With respect to embodiments of the S&D material system 2500, in the arrangement shown in FIG. 2C, (as well as FIGS. 3D, 4A, and 4D, discussed in more detail below) the upstream support and drainage material 500 and the downstream support and drainage material 500' are rotated 180 degrees with respect to each other, with filter media in between. Advantageously, this allows matching the local velocity to the needed flow rate through the filter or filter element.

Figure 3A:
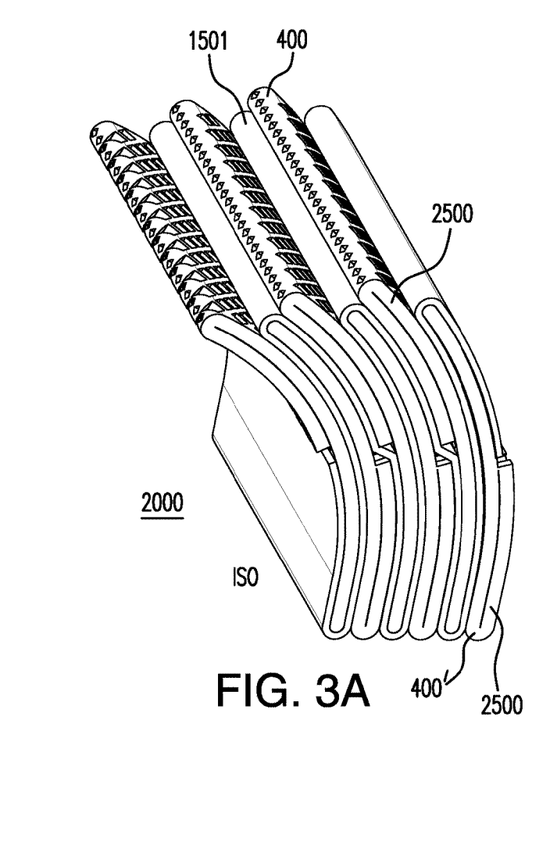
FIG. 3A shows an isometric view.

FIGS. 2A, 2C, 3A, 3D, 4A, and 4D show a filter system 2000 comprising a pleated porous filter 1500 comprising at least one pleated porous filter element 1501, arranged between an upstream support and drainage element 400 (as generally shown in FIGS. 1, 2A and 3A, also applicable to, for example, FIGS. 4A, 4D, and 5D) and an downstream support and drainage element 400', wherein materials 500 and 500' (comprising elements 400 and 400' respectively) comprise a support and drainage element system 2500.

Figures 3B, 3C, 3D:
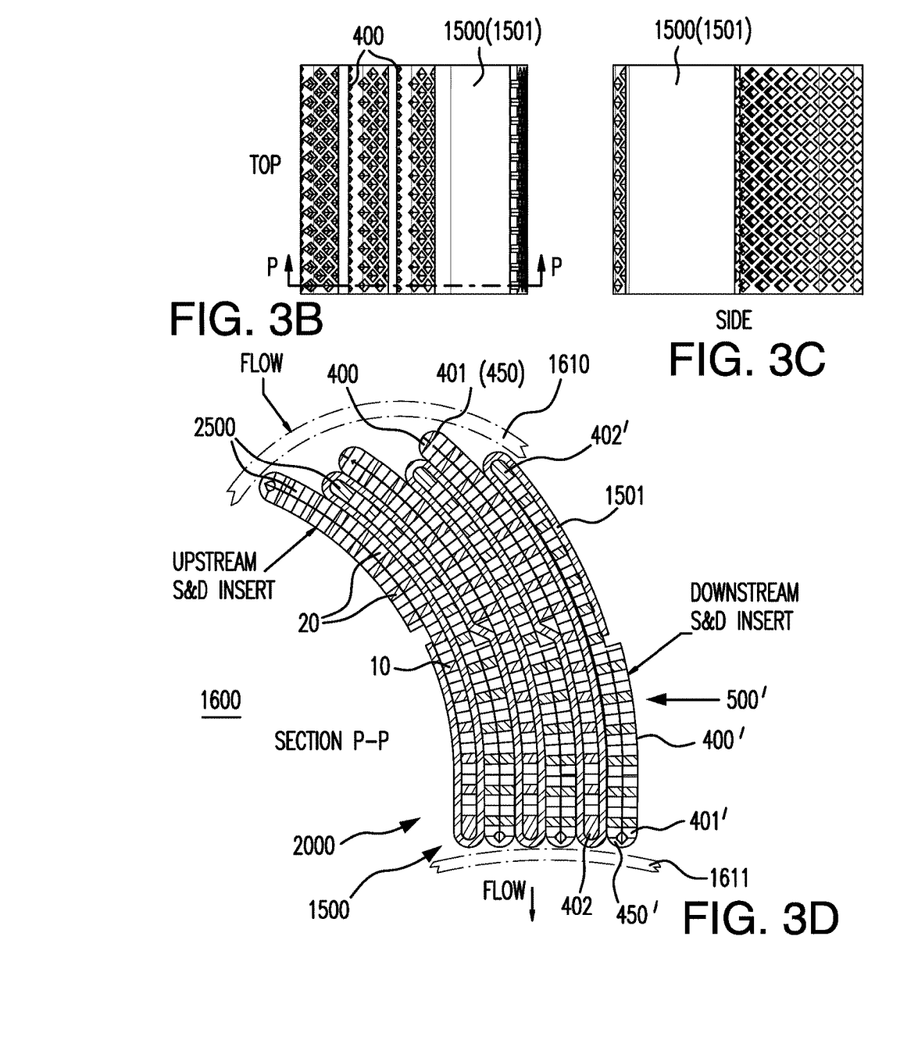
FIG. 3B shows a top view.
FIG. 3C shows a side view.
FIG. 3D shows a cross-sectional view of the filter system along sectional view P-P as shown in FIG. 3B as a filter cartridge comprising a pleated filter arranged between a filter cage and a filter core.

Embodiments with curved or curvable support and drainage materials are particularly suitable for LOP filter configurations (as described in, for example, U.S. Pat. No. 5,543,047). For example, FIG. 3D show an embodiment of a filter cartridge 1600 comprising an outer filter cage 1610, an inner core 1611, and a pleated filter 1500 comprising a pleated filter medium 1501, wherein the pleated filter has a LOP configuration, and embodiments of individual support and drainage materials 500, 500' (inserts) as generally shown in FIGS. 2A, 2C, and 3A, and also applicable to the materials shown in FIGS. 4A, 4D, and 5D (wherein the first support and drainage elements 400 and the second support and drainage materials 400' are rotated 180 degrees with respect to each other (providing an embodiment of a S&D element system)) arranged between each pleat of the pleated filter, such that both sides of each insert element contact a face of each filter pleat, and the outer tip of the respective insert contacts the inner surface of the cage or the inner surface of the inner core, spacing the pleat tip and pleat root away from the cage or core, thus protecting the pleat tip and pleat root, while allowing fluid flow therethrough. In this illustrated embodiment, the separate support and drainage materials (inserts) comprise 2 steps having a different bulk thickness. Moreover, in this illustrated embodiment, the thickness of the bulk at the first end is twice the thickness of the bulk at the second end.

FIGS. 4A-4D show yet another embodiment of a filter system 2000 and an embodiment of a support and drainage material system 2500 (wherein the support and drainage material system comprises a plurality of separate inserts). FIG. 4A shows an isometric view, FIG. 4B shows a top view, FIG. 4C shows a side view, and FIG. 4D shows a cross-sectional view (with arrows showing fluid flow) along the sectional End-End view shown in FIG. 4C. In this illustrated embodiment, the separate support and drainage materials (inserts) each comprise 4 steps, 10, 20, 30, and 40.

In contrast with FIGS. 2A and 2C, wherein the illustrated embodiment of the upstream and downstream arranged support and drainage materials (showing a plurality of separate inserts) each comprises an element comprising a mesh or a non-woven fabric having a first end and a second end, and at least a first section and a second section, the first section having a first major surface extending from the first end to the second end, and a second major surface extending from the first end to the second end; the second section having a first major surface extending a distance from the first end toward the second end, wherein the distance is less than a distance from the first end to the second end, and a second major surface extending a distance from the first end toward the second end, wherein the distance is less than the distance from the first end to the second end; and, a bulk through the element, extending between the first major surface of the second section and the second major surface of the first section, the bulk having a thickness extending from the first end to the second end; the bulk having a greater thickness at the first end and a lesser thickness at the second end; the embodiment of the upstream and downstream arranged support and drainage materials (showing a plurality of separate inserts) illustrated in FIG. 4 (see, for example, FIGS. 4A and 4D) comprises the first element and second element as generally illustrated in FIG. 2C and further comprises an additional element as part of each upstream and downstream support and drainage material.

Thus, FIGS. 4A and 4D illustrate an embodiment of a support and drainage material system comprising a first support and drainage material and a second separate support and drainage material 500, 500'; (a) the first support and drainage material comprising a first element 400 comprising a mesh or a non-woven fabric having a first end 401 and a second end 402, and at least a first section 411 and a second section 412, the first section having a first major surface 411a extending from the first end to the second end, and a second major surface 411b extending from the first end to the second end; the second section having a first major surface 412a extending a distance from the first end toward the second end, wherein the distance is less than a distance from the first end to the second end, and a second major surface 412b extending a distance from the first end toward the second end, wherein the distance is less than the distance from the first end to the second end; and, a bulk through the element, extending between the first major surface of the second section and the second major surface of the first section, the bulk having a thickness extending from the first end to the second end; the bulk having a greater thickness at the first end and a lesser thickness at the second end; and (b) the second support and drainage material 500' comprising a second element 400' comprising a mesh or a non-woven fabric having a first end 401' and a second end 402', and at least a first section 411' and a second section 412', the first section having a first major surface 411a' extending from the first end to the second end, and a second major surface 411b' extending from the first end to the second end; the second section having a first major surface 412a' extending a distance from the first end toward the second end, wherein the distance is less than a distance from the first end to the second end, and a second major surface 412b' extending a distance from the first end toward the second end, wherein the distance is less than the distance from the first end to the second end; and, a bulk through the element, extending between the first major surface of the second section and the second major surface of the first section, the bulk having a thickness extending from the first end to the second end; the bulk having a greater thickness at the first end and a lesser thickness at the second end; the system further comprising a third support and drainage material 500A comprising a third element 300 comprising a mesh or a non-woven fabric having a first end 301 and a second end 302, and at least a first section 311 and a second section 312, and a fourth separate support and drainage material 500B comprising a fourth element 300' comprising a mesh or a non-woven fabric having a first end 301' and a second end 302', and at least a first section 311' and a second section 312'; wherein the third support and drainage material is interposed between the first section and the second section of the first element; and, the fourth support and drainage material is interposed between the first section and the second section of the second element; wherein the first support and drainage material with the interposed third support and drainage material and the second support and drainage material with the interposed fourth support and drainage material are suitable for arrangement on opposing sides of a pleated filter.

In this illustrated embodiment, the sections 311, 311' respectively have a first major surface 311a, 311a' extending from the first end to the second end, and a second major surface 311b, 311b' extending from the first end to the second end; the sections 312, 312' respectively have a first major surface 312', 312a' extending a distance from the first end toward the second end, wherein the distance is less than a distance from the first end to the second end, and a second major surface 312b, 312b' extending a distance from the first end toward the second end, wherein the distance is less than the distance from the first end to the second end; and, a bulk through the element, extending between the first major surface of the second section and the second major surface of the first section, the bulk having a thickness extending from the first end to the second end; the bulk having a greater thickness at the first end and a lesser thickness at the second end Similar to the embodiment illustrated in FIG. 2C, in the embodiment shown in FIG. 4A, each first end 301, 301', 401, 401' includes a folded hinge 350, 350', 450, 450', as single continuous materials are folded to provide the 2 sections for each of the first and second elements.

Using the embodiment illustrated in FIG. 4D for reference, an embodiment of a method for filtering fluid in accordance with the invention comprises passing fluid through the first support and drainage material with the interposed third support and drainage material, the upstream surface of the pleated porous filter, the downstream surface of the pleated porous filter, and the second support and drainage material with the interposed fourth support and drainage material.

FIGS. 5A-5D show an embodiment of an individual support and drainage material 400 comprising an insert as shown in FIGS. 4A-4D, separated from the pleated porous filter. FIG. 5A shows an isometric view of separate first and third elements 400, 300, FIG. 5B shows a side view of the separate first and third elements based on the sectional End-End view shown in FIG. 5C, also showing the sections and major surfaces of each element, FIG. 5C shows an assembled side view, and FIG. 5D shows an assembled end view along the sectional End-End view shown in FIG. 5C, also showing 4 steps, 10, 20, 30, and 40.

The support and drainage materials (meshes and fabrics) can be fabricated from any suitable material which is suitable for the fluid being filtered and for the applicable filtration parameters such as temperature.

The support and drainage materials can be produced by a variety of methods known in the art, including, for example, additive manufacturing (sometimes referred to as "additive layer manufacturing" or "3D printing").

In those embodiments comprising meshes wherein the meshes are polymeric, polymeric meshes come in the form of woven meshes and extruded meshes. Either type may be employed, but extruded meshes can be preferable because they are smoother and therefore produce less abrasion of adjoining sections of the filter media. An extruded mesh may have a first set of parallel strands and a second set of parallel strands intersecting the first set of strands at an angle. Extruded meshes may be classified as either symmetrical or non-symmetrical. In a symmetrical mesh, neither of the first or second sets of strands extends in the so-called "machine direction" of the mesh, which is the direction in which the mesh emerges from the mesh manufacturing machine. In a non-symmetrical mesh, one of the sets of strands extends parallel to the machine direction. Either symmetrical or non-symmetrical meshes can be used in accordance with embodiments of the invention.

A variety of meshes are suitable for use in accordance with embodiments of the invention. For example, suitable extruded polymeric meshes include those available from Schweiter-Mauduit International Inc. (Alpharetta, Ga.) under the trade name DELNET.

Meshes can be characterized by their thickness and by the number of strands per inch. These dimensions are not limited to any particular values and can be chose in accordance with the desired edgewise flow characteristics of the mesh and the desired strength. Typically, the mesh with have a mesh count of at least about 5 strands per inch.

In those embodiments comprising non-woven fabrics wherein the fabrics are polymeric, the non-woven fabric can be fabricated from any polymeric material, including polyester, polypropylene, or polyamide (e.g., nylon) which is suitable for the fluid being filtered and for the applicable filtration parameters such as temperature.

A variety of non-woven fabrics are suitable for use in accordance with embodiments of the invention. For example suitable non-woven fabrics include polyester spunbonded non-woven fabrics available from Avintiv Technical Non-wovens (Old Hickory, Tenn.) under the trade names REEMAY (e.g., REEMAY 2011 and REEMAY 2250) and TYPAR.

Typically, the mesh or non-wovens have a thickness in the range of from about 0.0005" to about 0.025" (more typically from about 0.005" to about 0.030"), and a void fraction of about 30% or more, but thicknesses can be greater or lesser than that range, and the void fraction can be less than that value. In those embodiments wherein the mesh or non-woven is folded and/or corrugated, the mesh or non-woven is sufficiently pliable to avoid damage to the mesh or non-woven and to the filter and filter element.

Meshes and non-woven fabrics comprising a bulk having a greater thickness at one end and a lesser thickness at the other end can be obtained in a number of ways. For example, a mesh or fabric can include one or more folded portions between one end and the other end, and the thickness increases with each fold or additional fold. Alternatively, for example, a plurality of layers may be superimposed upon one another.

A porous filter and/or a porous filter element (e.g., a porous membrane and/or a porous fibrous medium) can have any suitable pore structure, e.g., a pore size (for example, as evidenced by bubble point, or by KL as described in, for example, U.S. Pat. No. 4,340,479, or evidenced by capillary condensation flow porometry), a pore rating, a pore diameter (e.g., when characterized using the modified OSU F2 test as described in, for example, U.S. Pat. No. 4,925,572), or removal rating that reduces or allows the passage therethrough of one or more materials of interest as the fluid is passed through the element. The pore structure used depends on the composition of the fluid to be treated, and the desired effluent level of the treated fluid.

The filter element can have any desired critical wetting surface tension (CWST, as defined in, for example, U.S. Pat. No. 4,925,572). The CWST can be selected as is known in the art, e.g., as additionally disclosed in, for example, U.S. Pat. Nos. 5,152,905, 5,443,743, 5,472,621, and 6,074,869. The surface characteristics of the element can be modified (e.g., to affect the CWST, to include a surface charge, e.g., a positive or negative charge, and/or to alter the polarity or hydrophilicity of the surface) by wet or dry oxidation, by coating or depositing a polymer on the surface, or by a grafting reaction.

The filter can include additional elements, layers, or components, that can have different structures and/or functions, e.g., prefiltration upstream of the filter media and/or cushioning (cushioning upstream of the filter media for damage protection or cushioning downstream of the filter media for damage protection and/or media support).

In accordance with embodiments of the invention, the filter and/or filter element can have a variety of configurations, including planar, pleated, and hollow cylindrical.

Exemplary filters and filter elements, including pleated filters, are disclosed in U.S. Pat. Nos. 5,543,047 and 5,552,048.

The filter, in some embodiments comprising a plurality of filter elements is typically disposed in a housing comprising at least one inlet and at least one outlet and defining at least one fluid flow path between the inlet and the outlet, wherein the filter is across the fluid flow path, to provide a filter device. Preferably, the filter device is sterilizable. Any housing of suitable shape and providing at least one inlet and at least one outlet may be employed.

The housing can be fabricated from any suitable rigid impervious material, including any impervious thermoplastic material, which is compatible with the fluid being processed. For example, the housing can be fabricated from a metal, such as stainless steel, or from a polymer.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A support and drainage material system comprising
a first support and drainage material and a second separate support and drainage material;
(a) the first support and drainage material comprising a first element comprising a mesh or a non-woven fabric having a first end and a second end, and at least a first section and a second section,
the first section having a first major surface extending from the first end to the second end, and a second major surface extending from the first end to the second end;
the second section having a first major surface extending a distance from the first end toward the second end, wherein the distance is less than a distance from the first end to the second end, and a second major surface extending a distance from the first end toward the second end, wherein the distance is less than the distance from the first end to the second end;
and,
a first thickness through the first element, extending between the first major surface of the second section and the second major surface of the first section, where the second section and the first section are both present, the first element having a second thickness extending between the first major surface of the first section and the second major surface of the first section, the first thickness at the first end being greater than the second thickness at the second end, where the second section is not present; and
(b) the second separate support and drainage material comprising a second element comprising a mesh or a non-woven fabric having a first end of the second element and a second end of the second element, and at least a first section of the second element and a second section of the second element,
the first section of the second element having a first major surface extending from the first end of the second element to the second end of the second element, and a second major surface extending from the first end of the second element to the second end of the second element;
the second section of the second element having a first major surface extending a distance from the first end of the second element toward the second end of the second element, wherein the distance that the first major surface extends is less than a distance from the first end of the second element to the second end of the second element, and a second major surface extending a distance from the first end of the second element toward the second end of the second element, wherein the distance that the second major surface extends is less than the distance from the first end of the second element to the second end of the second element;
and,
a first thickness through the second element, extending between the first major surface of the second section of the second element and the second major surface of the first section of the second element, where the second section of the second element and the first section of the second element are both present, the the second element having a second thickness extending between the first major surface of the first section of the second element and the second major surface of the first section of the second element, the first thickness at the first end of the second element being greater than the second thickness at the second end of the second element, where the second section of the second element is not present;
the support and drainage material system further comprising
a third support and drainage material comprising a third element comprising a mesh or a non-woven fabric having a first end of the third element and a second end of the third element, and at least a first section of the third element and a second section of the third element,
the first section of the third element having a first major surface extending from the first end of the third element to the second end of the third element, and a second major surface extending from the first end of the third element to the second end of the third element;
the second section of the third element having a first major surface extending a distance from the first end of the third element toward the second end of the third element, wherein the distance that the first major surface extends is less than a distance from the first end of the third element to the second end of the third element, and a second major surface extending a distance from the first end of the third element toward the second end of the third element, wherein the distance that the second major surface extends is less than the distance from the first end of the third element to the second end of the third element;
and
a fourth separate support and drainage material comprising a fourth element comprising a mesh or a non-woven fabric having a first end of the fourth element and a second end of the fourth element, and at least a first section of the fourth element and a second section of the fourth element;
the first section of the fourth element having a first major surface extending from the first end of the fourth element to the second end of the fourth element, and a second major surface extending from the first end of the fourth element to the second end of the fourth element;
the second section of the fourth element having a first major surface extending a distance from the first end of the fourth element toward the second end of the fourth element, wherein the distance that the first major surface extends is less than a distance from the first end of the fourth element to the second end of the fourth element, and a second major surface extending a distance from the first end of the fourth element toward the second end of the fourth element, wherein the distance that the second major surface extends is less than the distance from the first end of the fourth element to the second end of the fourth element;

wherein the third support and drainage material is interposed between the first section and the second section of the first element wherein the second major surface of the second section of the third element contacts the first major surface of the first section of the third element; and, the fourth separate support and drainage material is interposed between the first section and the second section of the second element wherein the second major surface of the second section of the fourth element contacts the first major surface of the first section of the fourth element;

wherein the first support and drainage material with the interposed third support and drainage material and the second separate support and drainage material with the interposed fourth separate support and drainage material are suitable for arrangement on opposing sides of a pleated filter.

2. A filter system comprising:

a pleated porous filter having an upstream surface and a downstream surface, the upstream surface having a first upstream end and a second upstream end, and the downstream surface having a first downstream end and a second downstream end; and the support and drainage material system of claim 1, wherein the pleated porous filter is arranged between (a) the first support and drainage material having the third support and drainage material interposed between the first section and the second section of the first element, providing a combined bulk of the first support and drainage material and the third support and drainage material, and the combined bulk of the first support and drainage material and the third support and drainage material has a thickness at the first end of the first support and drainage material having the third support and drainage material interposed between the first section and the second section of the first element that is at least twice a thickness at the second end of the first support and drainage material having the third support and drainage material interposed between the first section and the second section of the first element; and, (b) the second separate support and drainage material having the fourth separate support and drainage material interposed between the first section and the second section of the second element, providing a combined bulk of the second separate support and drainage material and the fourth separate support and drainage material, and the combined bulk of the second support and drainage material and the fourth separate support and drainage material has a thickness at the first end of the second support and drainage material having the fourth separate support and drainage material interposed between the first section and the second section of the separate second support and drainage material that is at least twice a thickness at the second end of the separate second support and drainage material having the fourth separate support and drainage material interposed between the first section and the second section of the separate second support and drainage material; and the first support and drainage material and the second separate support and drainage material are rotated 180 degrees with respect to each other such that the first end of the first element of the first support and drainage material faces in a direction 180 degrees opposite than a direction of the first end of the second element of the second separate support and drainage material.

3. A filter arrangement comprising:

a pleated porous filter having an upstream surface and a downstream surface, the upstream surface having a first upstream end and a second upstream end, and the downstream surface having a first downstream end and a second downstream end; and a support and drainage material comprising:

a first element comprising a mesh or a non-woven fabric having a first end and a second end, and at least a first section and a second section, the first section having a first major surface extending from the first end to the second end, and a second major surface extending from the first end to the second end;

the second section having a first major surface extending a distance from the first end of the first element toward the second end of the first element, wherein the distance that the first major surface of the second section extends is less than a distance from the first end of the first element to the second end of the first element, and a second major surface extending a distance from the first end of the first element toward the second end of the first element, wherein the distance that the second major surface of the second section extends is less than the distance from the first end of the first element to the second end of the first element;

and, a first thickness through the first element, extending between the first major surface of the second section and the second major surface of the first section, where the second section and the first section are both present, the first element having a second thickness extending between the first major surface of the first section and the second major surface of the first section, the first thickness at the first end being greater than the second thickness at the second end where the second section is not present, wherein the first thickness at the first end of the first element is at least twice the second thickness at the second end of the first element;

the support and drainage material further comprising:

a second element comprising a mesh or a non-woven fabric having a first end and a second end, and at least a second element first section and a second element second section, the second element first section having a first major surface extending from the first end of the second element to the second end of the second element, and a second major surface extending from the first end of the second element to the second end of the second element;

the second element second section having a first major surface extending a distance from the first end of the second element toward the second end of the second element, wherein the distance that the first major surface of the second element second section extends is less than a distance from the first end of the second element to the second end of the second element, and a second major surface extending a distance from the first end of the second element toward the second end of the second element, wherein the distance that the second major surface of the second element second section extends is less than the distance from the first end of the second element to the second end of the second element;

and,
a first thickness through the second element, extending between the first major surface of the second section of the second element and the second major surface of the first section of the second element, where the second section of the second element and the first section of the second element are in contact, the second element having a second thickness extending between the first major surface of the first section of the second element and the second major surface of the first section of the second element, the first thickness at the first end of the second element being greater than the second thickness at the second end of the second element, where the second section of the second element is not present, wherein the first thickness at the first end of the second element is at least twice the second thickness at the second end of the second element;

wherein the second element is interposed between the first section and the second section of the first element, such that the second element second section is interposed between the second section of the first element and the second element first section, and the second element first section is interposed between the second element second section and the first section of the first element and the second major surface of the second element second section contacts the first major surface of the second element first section, wherein the support and drainage material has a combined bulk of the first element and the second element, and the combined bulk has a thickness at a first end of the support and drainage material that is at least twice the thickness of the combined bulk at a second end of the support and drainage material;

arranged to contact the upstream surface of the pleated porous filter, or to contact the downstream surface of the pleated porous filter.

4. The filter arrangement of claim 3, wherein the mesh or non-woven fabric of the first element and the second element of the support and drainage material is folded, to provide the first and second sections of both the first element and the second element.

5. A filter system comprising:
a pleated porous filter having an upstream surface and a downstream surface, the upstream surface having a first upstream end and a second upstream end, and the downstream surface having a first downstream end and a second downstream end; and
a support and drainage material system comprising
a first support and drainage material and a second separate support and drainage material;
(a) the first support and drainage material comprising a first element comprising a mesh or a non-woven fabric having a first end and a second end, and at least a first section and a second section,
the first section having a first major surface extending from the first end to the second end, and a second major surface extending from the first end to the second end;
the second section having a first major surface extending a distance from the first end toward the second end, wherein the distance is less than a distance from the first end to the second end, and a second major surface extending a distance from the first end toward the second end, wherein the distance is less than the distance from the first end to the second end,
wherein the second major surface of the second section contacts the first major surface of the first section;
and,
a first thickness through the first element, extending between the first major surface of the second section and the second major surface of the first section, where the second section and the first section are both present, the first element having a second thickness extending between the first major surface of the first section and the second major surface of the first section, the first thickness at the first end being greater than the second thickness at the second end, where the second section is not present and (b) the second separate support and drainage material comprising a second element comprising a mesh or a non-woven fabric having a first end of the second element and a second end of the second element, and at least a first section of the second element and a second section of the second element,
the first section of the second element having a first major surface extending from the first end of the second element to the second end of the second element, and a second major surface extending from the first end of the second element to the second end of the second element;
the second section of the second element having a first major surface extending a distance from the first end of the second element toward the second end of the second element, wherein the distance that the first major surface extends is less than a distance from the first end of the second element to the second end of the second element, and a second major surface extending a distance from the first end of the second element toward the second end of the second element, wherein the distance that the second major surface extends is less than the distance from the first end of the second element to the second end of the second element, wherein the second major surface of the second section of the second element contacts the first major surface of the first section of the second element;
and,
a first thickness through the second element, extending between the first major surface of the second section of the second element and the second major surface of the first section of the second element, where the second section of the second element and the first section of the second element are both present, the second element having a second thickness extending between the first major surface of the first section of the second element and the second major surface of the first section of the second element, the first thickness at the first end of the second element being greater than the second thickness at the second end of the second element, where the second section of the second element is not present;

wherein the first support and drainage material and the second separate support and drainage material are suitable for arrangement on opposing sides of a pleated filter;
wherein the pleated porous filter is arranged between the first support and drainage material and the second separate support and drainage material, and the first support and drainage material and the second separate support and drainage material are rotated 180 degrees with respect to each other such that the first end of the first element of the first support and drainage material faces in a direction 180 degrees opposite than a direction of the first end of the second element of the second separate support and drainage material.

6. The filter system of claim 5, wherein the pleated porous filter comprises a laid-over-pleat filter.

7. The filter system of claim 5, further comprising an inner core and an outer cage.

8. A method of filtering fluid, the method comprising passing a fluid through the filter system of claim 5, including passing fluid through the first support and drainage material, the upstream surface of the pleated porous filter, the downstream surface of the pleated porous filter, and the second separate support and drainage material.

\* \* \* \* \*